May 27, 1930.  F. B. McKINNEY ET AL  1,760,602
PRESSURE APPLYING AND INDICATING DEVICE FOR BRAKE PEDALS
Filed July 22, 1927  2 Sheets-Sheet 1
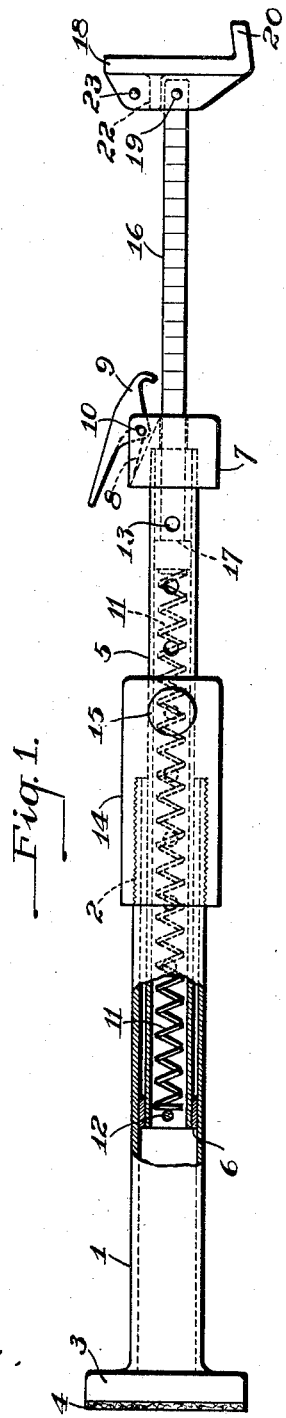
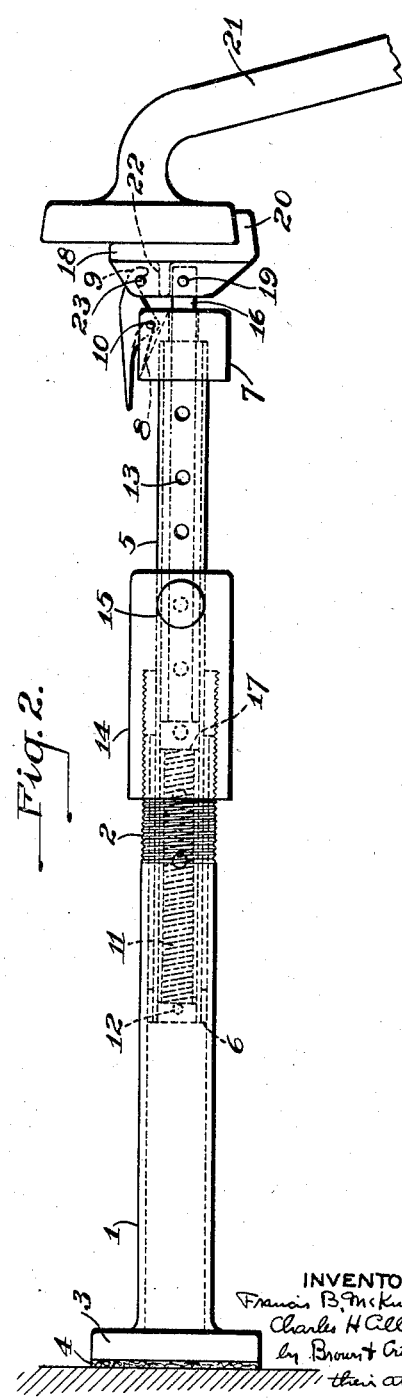

May 27, 1930.  F. B. McKINNEY ET AL  1,760,602
PRESSURE APPLYING AND INDICATING DEVICE FOR BRAKE PEDALS
Filed July 22, 1927    2 Sheets-Sheet 2
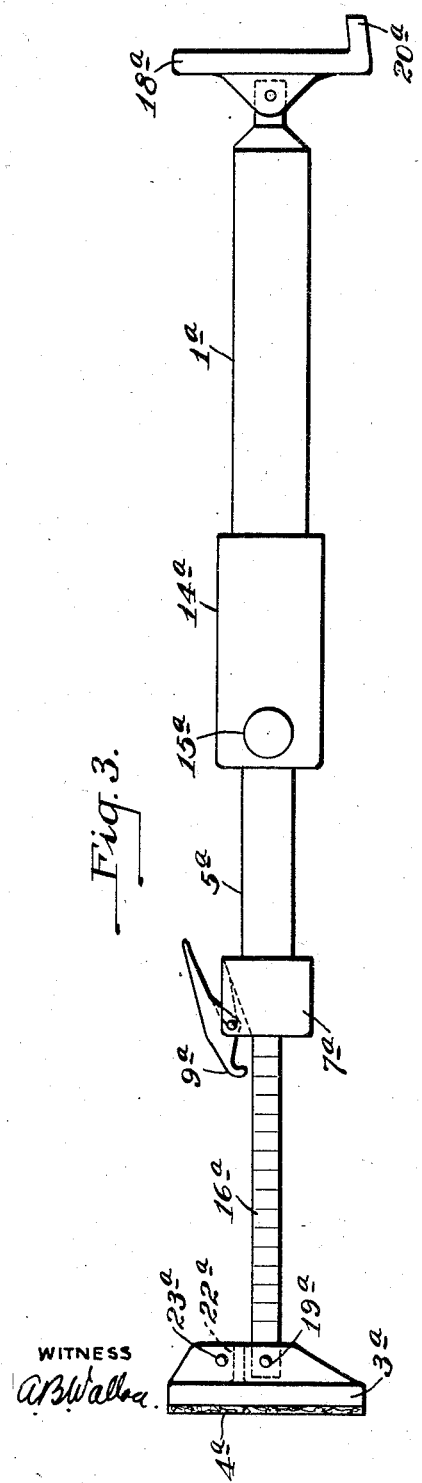
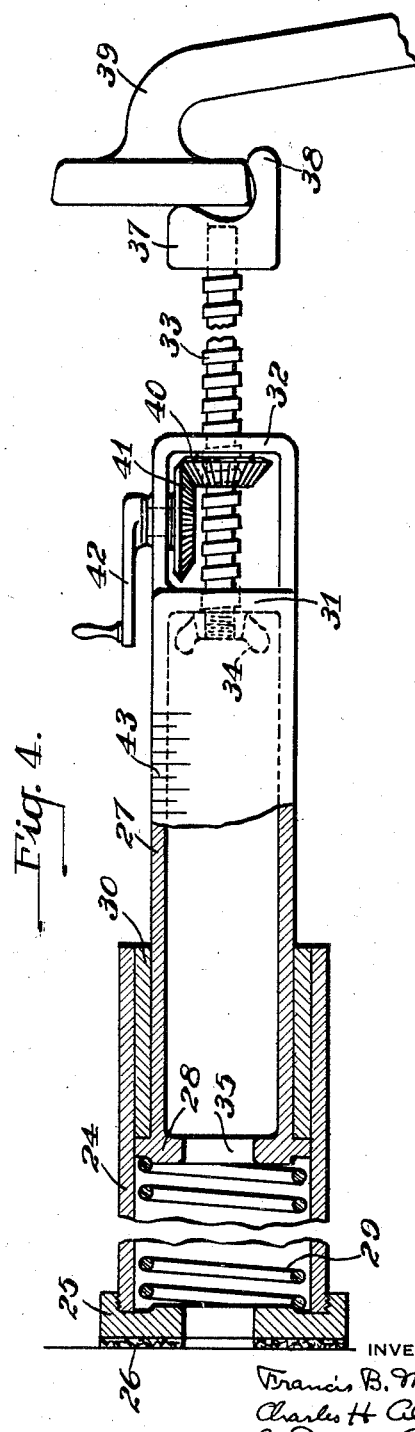
WITNESS
INVENTOR Patented May 27, 1930

1,760,602

UNITED STATES PATENT OFFICE

FRANCIS B. McKINNEY, OF BALDWIN TOWNSHIP, ALLEGHENY COUNTY, AND CHARLES H. ALLEN, OF PITTSBURGH, PENNSYLVANIA, ASSIGNORS TO AUTO BRAKEOMETER CORPORATION, OF PITTSBURGH, PENNSYLVANIA, A CORPORATION OF PENNSYLVANIA

PRESSURE-APPLYING AND INDICATING DEVICE FOR BRAKE PEDALS

Application filed July 22, 1927. Serial No. 207,667.

This invention relates to brake testing devices for automobiles or the like, and more particularly to a device adapted to apply a constant predetermined pressure on the operating pedal while the brakes are being adjusted or tested for braking power.

Accurate adjustment of brakes is generally recognized as essential to the efficient and safe operation of automotive vehicles. To properly adjust automobile brakes it is necessary that the braking effort of the respective brakes be equalized on opposite wheels, and to any given ratio between front and rear wheels, to produce equal wear of the brake band and drum on all braking and to prevent skidding and swerving of the vehicle when the brakes are suddenly applied.

In adjusting brakes the prevailing practice is to raise the wheel or wheels from the ground for the purpose of determining the resistance of the brakes to the turning of the wheel, which may be accomplished by measuring the effort necessary to rotate the wheel when the brake is set. If all the brakes are equalized the resistance to a given force necessary to rotate a wheel is the same for all the wheels.

To facilitate making the necessary brake adjustment, and for the convenience of the tester or adjuster, it is customary to provide means for maintaining the brake pedal in a braking position for applying pressure to the brakes during their adjustment. For this purpose a board or other spacing element adapted to engage the foot pedal and rest against the seat of the vehicle has been utilized.

The object of this invention is to provide a simple, compact and durable device for applying a uniform predetermined pressure to automobile brake pedals, which device is provided with means for indicating the pressure applied, and which is adjustable to vary the pressure used and to make it capable of use with the brake pedals of various makes of automobiles.

In the accompanying drawings, Fig. 1 is an elevation, partially in section, of a brake pedal pressure-applying and indicating device embodying the principle of this invention; Fig. 2 an elevation illustrating the application of the device to a brake pedal; Fig. 3 a modification of the device shown in Fig. 1; and Fig. 4 an elevation, partly in section, of still another modification.

Referring to Figs. 1 and 2, the structure therein illustrated comprises a tubular base 1 provided with an exteriorly threaded portion 2 at one end thereof and a flange 3 at the other, adapted to bear against a seat board. The flange may be provided with leather 4 or other suitable facing material to prevent it from scratching or marring a seat board. Within tubular member 1 there is an adjustable extension member 5, also tubular, one end of which is provided with a sleeve 6 which may be welded or joined thereto in any suitable manner, and which is of the inner dimension of base 1 and is in sliding contact therewith. The other end of the extension member is provided with a collar 7 having a slotted portion 8 for a latch 9 pivotally secured to the collar by a pin 10. Disposed within member 5 there is a weighing means which is preferably a coil spring 11 resting against a pin 12 passing through the sleeve 6 and tubular member 5 to form a spring stop. A series of openings 13, which may be successively marked in any suitable manner is provided in member 5 for a purpose hereinafter set forth. An adjustable sleeve 14, interiorly screw-threaded to interact with the threaded portion of base 1, is operatively mounted on the end of the latter and is provided with a movable pin 15 adapted to fit the openings 13 in member 5.

Disposed within adjustable member 5 is a rod 16 having a head 17 at its inner end, of the inner dimensions of tube 5, and adapted to rest against the free end of the spring 11. Rod 16 is graduated or marked, as illustrated in Fig. 1. A bracket 18, pivotally connected at 19 to rod 16, is provided with a projection 20 adapted to engage a brake foot pedal 21. Bracket 18 is provided with a slotted portion 22 having a pin 23 extending through it and adapted to be engaged by latch 9, as shown in Fig. 2.

The operation of this device is as follows: Rod 16 is pressed inwardly against spring 11 and held in such position by latch 9, as shown in Fig. 2. Bracket 18 is then placed against brake pedal 21 with lug 20 resting on one edge of the pedal. Extension member 5 is next adjusted to the space between the bottom portion of a seat and the brake pedal by fitting pin 15 in one of the openings 13 suitable for the major adjustment, and by turning sleeve 14 on thread 2 of the base for the finer adjustment until the play in brake 21 has been completely taken up, but without applying substantial pressure on the brake.

When this adjustment is completed the latch is moved to release pin 23 and member 16, thus subjecting bracket 18, and foot pedal 21 which it engages, to the full pressure of spring 11, and, if the adjustment of the device has been properly made to take up all the slack in the brake pedal without applying substantial pressure thereto, the effective pressure on the brake or brake mechanism after latch 9 releases the bracket will be the pressure of compressed spring 11.

In actual practice it has been found that a spring calibrated at sixty-five pounds pressure is adequate for this purpose, this being the normal brake pressure usually exerted on a brake pedal in its operation. With the pressure thus applied to the brakes, they may be equalized by adjustment to a predetermined force which must be applied to rotate the wheel. A convenient means for ascertaining the necessary brake adjustment is disclosed in a copending application, Serial No. 60,850, filed October 6, 1925.

If it is desired to adjust the brake for a lesser pressure than the calibrated pressure of the spring 11 for the purpose of making the brake mechanism responsive to less force applied to the brake pedal, it is only necessary to adjust extension member 5 by rotating sleeve 2 in accordance with the calibrations on the pressure rod 16, which, in the illustration, is calibrated for a variety of adjustments, each designating a certain amount of pressure on the brake pedal. With a device of the character described brakes may be easily, and without guess work, set at a predetermined operating pressure.

Fig. 3 represents a modification of the device shown in Figs. 1 and 2, in which the pedal-engaging bracket and flanged base are interchanged. Tubular member 1ª, carries at one end a pedal-engaging member 18ª, and slidably mounted in the base 1ª is another tubular member 5ª. A rod 16ª, slidingly fitting in member 5ª carries a base member 3ª, backed with a non-scratching facing 4ª. This modified form in its other details and operation is identical with that of Figs. 1 and 2. It has, however, the advantage that graduated thrust rod 16ª is fully exposed to the tester's or adjuster's view, whereas in the Figs. 1 and 2 form this member is located near the foot pedal, and it is often difficult to read the scale in that position.

Fig. 4 shows another modification of construction for attaining the desired results, and which is more readily adjustable. This form comprises a tubular base member 24, open at one end, and provided at the other with a flange 25 screwed thereon and faced with leather or other suitable material 26. A tubular extension member 27, having a bottom flanged portion 28 of such size that it slides freely in the base, is adapted to act upon one end of a coil spring 29 which seats on flange 25. Member 27 is retained in the base by a bushing 30, which acts as a stop for flange 28.

The upper end of member 27 is provided with transverse brackets 31 and 32 for receiving a rotatable screw 33 which engages threads cut in the brackets. A wing nut 34 threaded on the end of the screw acts as a stop when the screw has been fully extended. Flange 28 is provided with an opening 35 through which the nut and screw may pass when fully depressed. Mounted on the upper end of screw 33 is a pedal-engaging bracket 37, having a lug 38, for engaging a brake foot pedal 39, as shown. Screw 33 is moved into or out of member 27 by means of a bevel gear 40, which is interiorly threaded to correspond to the threads on screw 33, and which is suitably journalled for rotation in bracket 32. Meshing with gear 40 is another bevel gear 41, journalled in the side of member 27 and fastened to the shaft of a crank 42.

In using this modified form, the screw is extended by rotation of crank 42 until bracket 37 engages the pedal, the base being rested against a seat board. Further extension of the screw takes up the slack in the pedal, and when pressure begins to be supplied to the brake in this manner, the thrust created by the resistance of the braking mechanism forces member 27 back against the spring 29, which latter takes up this thrust. The amount of pressure applied to the brake is thus easily variable, owing to the ease of operation and capability of fine adjustment of the screw, and this pressure is weighed and registered upon a graduated scale 43, marked on one side of member 27.

According to the provisions of the patent statutes, we have explained the principle and operation of our invention and have illustrated and described several embodiments of it. However, we desire to have it understood that, within the scope of the appended claims, the invention may be practiced by other forms of construction than those particularly illustrated and described.

We claim:

1. A brake pedal pressure-applying and indicating device, comprising seat board and pedal-engaging members telescopically connected to each other for relative longitudinal movements, a graduated scale on one of said members for indicating the pressure applied to a foot pedal by the device, means for adjusting said members to variable relative extended positions, yielding weighing means acting constantly between said members to urge them to their extended positions as variably adjusted, and releasable means for temporarily locking said members in their collapsed position.

2. A brake pedal pressure-applying and indicating device, comprising in combination a casing, a longitudinally adjustable member disposed therein, an extensible compression member disposed in said adjustable member, said extensible member being provided with a scale for indicating the pressure applied to a brake pedal by the device, a yielding weighing device acting constantly between said adjustable and compression members to urge the latter to its extended position, seat board and pedal-engaging means connected to said casing and compression members, and means for locking the parts in a fixed position.

3. A brake pedal pressure-applying and indicating device, comprising in combination a tubular casing, a base thereon adapted to bear against a seat board, a sleeve adjustably attached to one end of said casing, a longitudinally adjustable member disposed within said sleeve and casing, means for adjustably connecting said sleeve to said adjustable member, an extensible rod longitudinally movable in said adjustable member, and provided with a graduated scale for indicating the pressure applied to a brake pedal, a yielding weighing device constantly acting between said adjustable member and rod to urge the latter to its extended position, a pedal-engaging bracket mounted on said rod, and releasable means for locking said adjustable parts in a fixed position.

4. A brake pedal pressure-applying and indicating device, comprising in combination, a tubular casing having an open end and provided at its other end with a flanged base adapted to bear against a seat board, a threaded sleeve engaging the open end of said casing, a longitudinally adjustable member disposed within said sleeve and casing, a series of openings in said member, a movable pin in said sleeve adapted to engage said holes to lock said member in a fixed position, an extensible rod disposed in said adjustable member, a spring mounted in said adjustable member to constantly urge said rod to its extended position, a pedal-engaging bracket pivotally attached to the outer end of said rod, a latch on said adjustable member adapted to engage said bracket to hold the rod inwardly during adjustment of the device, and a scale on said rod for indicating the pressure exerted on a foot pedal by the device.

In testimony whereof, we hereunto sign our names.

FRANCIS B. McKINNEY.
CHARLES H. ALLEN.